A. G. LEMING.
Hand-Stamps.

No. 148,373. Patented March 10, 1874.

Witnesses:

Inventor:
A. G. Leming
Per
Attorneys.

UNITED STATES PATENT OFFICE.

ADOLPHUS G. LEMING, OF WALDRON, ARKANSAS.

IMPROVEMENT IN HAND-STAMPS.

Specification forming part of Letters Patent No. 148,373, dated March 10, 1874; application filed July 12, 1873.

*To all whom it may concern:*

Figure 1:
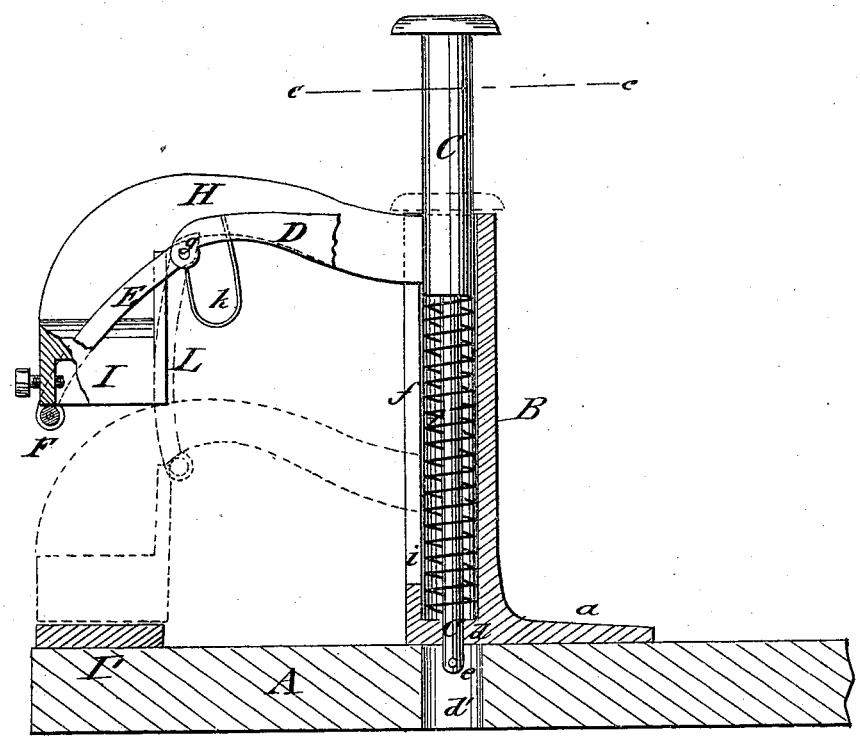
Figure 2:
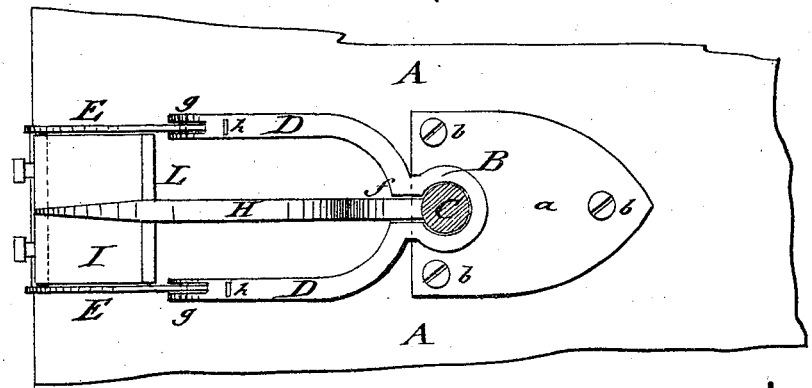

Be it known that I, ADOLPHUS G. LEMING, of Waldron, in the county of Scott and State of Arkansas, have invented a new and Improved Hand-Stamp, of which the following is a specification:

In the accompanying drawing, Figure 1 represents a side elevation, partly in section, of my improved stamping-machine; and Fig. 2, a top view of the same, partly in section, on the line *c c*, Fig. 2.

Similar letters of reference indicate corresponding parts.

The invention will first be fully described, and then clearly pointed out in the claims.

In the drawing, A represents the table or base to which the stamping-machine is attached. The upright cylindrical casing B is rigidly connected thereto by a horizontal flange-extension, *a*, and screws *b*. Base A and casing B may also be cast in one piece of suitable metal, if desired. A vertical central perforation, *d*, of the bottom of casing B corresponds with a larger aperture, *d'*, of base A, and guides the main shaft C of the machine in its up and downward motion in casing B. When the machine is designed as a hand-stamp, a suitable collar or other stop of shaft C prevents the disconnection of the same on its upward motion; but when the machine is to be operated by means of a treadle below the table A, a hole, *e*, is provided at the lower end, through which a hook is placed, which is connected to the treadle by a cord, and serves also as a stop for the shaft C. The casing B has a vertical slot, *f*, which guides the projecting arm of shaft C, and has also at its upper end the U-shaped stationary arms D, which may be cast in one piece with casing B, or be otherwise firmly connected thereto. The ends of arms D are recessed to admit the rods E, which are pivoted to them at *g*. Band-springs *h* are firmly applied at one end to arms D, and bent in such a manner that their other ends act on the rods E below pivots *g*, so that they are forced in an outward direction thereby. The pivoted ends of rods E are of oblique shape, and are held in a fixed position by the pressure of springs *h*. To the outer ends of rods E is laterally pivoted the inking-roller F.

The shaft C is made at its upper end with the same diameter as casing B, and has a rounded head, G, if used as a hand-stamp. The lower part of shaft C is of less thickness, and surrounded by a spiral spring, *i*, which acts on the thicker part, and produces the upward motion of shaft C after each downstroke. The curved arm H projects forward between arms D of casing B, and carries at its end the horizontal type-bed or marking-stamp I. Under right angles to type-bed I, and facing toward shaft C, is arranged the inking-plate L, and below type-bed I, fastened to table A, the stamp-bed I'. On the downward motion of shaft C, the inking-roller F, which is held by springs *h* at the outer edge of the type-bed I, passes over the same, and then upward along inking-plate L, while at the same time the type-bed I is stamping the object placed on bed I'. On the upward motion of shaft C, the inking-roller F passes again over plate L, and forward over type-bed I. The inking-roller F passes twice over the type-bed I and inking-plate L, and inks, therefore, the former more completely than if passing only once, so that, consequently, more uniform impressions are produced.

The canceling of post-stamps, marking of letters, &c., are accomplished in considerable less time, even if the machine is used as a hand-stamp, than by the common hand-stamp and inking-pad. In connection with a treadle the operation is more rapid, as both hands can be used to feed the machine.

Having thus described my invention, I claim as new and desire to secure by Letters Patent—

1. The springs *h* and rods E, combined in the manner described, to form a connection between the casing-arms D and the printing-roll F.

2. The casing B, having flange *a*, hole *d*, slot *f*, and U-shaped arms D, as set forth.

ADOLPHUS G. LEMING.

Witnesses:
THOMAS J. TATE,
SAMUEL K. DUNCAN.